United States Patent
Raman et al.

(10) Patent No.: US 12,283,732 B2
(45) Date of Patent: Apr. 22, 2025

(54) REACTANT FEED AND RETURN ASSEMBLY FOR FUEL CELL STACKS INCLUDING A NOZZLE STRUCTURE

(71) Applicant: BLOOM ENERGY CORPORATION, San Jose, CA (US)

(72) Inventors: Annamalai Raman, Bangalore (IN); Karanpal Bhangu, Manteca, CA (US); Victor Fung, Daly City, CA (US); Nilanjana Basu, San Jose, CA (US); Michael Petrucha, Santa Clara, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/052,816

(22) Filed: Nov. 4, 2022

(65) Prior Publication Data
US 2023/0253606 A1 Aug. 10, 2023

(30) Foreign Application Priority Data
Feb. 9, 2022 (IN) .............................. 202241006957

(51) Int. Cl.
*H01M 8/2484* (2016.01)
*H01M 8/04089* (2016.01)
(Continued)

(52) U.S. Cl.
CPC ..... *H01M 8/2484* (2016.02); *H01M 8/04097* (2013.01); *H01M 8/2425* (2013.01); *H01M 8/249* (2013.01); *H01M 2008/1293* (2013.01)

(58) Field of Classification Search
CPC .......... H01M 8/2484; H01M 8/04097; H01M 8/2425; H01M 8/249; H01M 2008/1293
See application file for complete search history.

(56) References Cited

U.S. PATENT DOCUMENTS 10,211,478 B2  2/2019  Armstrong et al.
10,511,047 B2  12/2019  Armstrong et al.
(Continued)

FOREIGN PATENT DOCUMENTS

CN     113036191 B  *  3/2022  ............... C25B 1/04
DE     102017202705 A1   8/2018
JP     5502615 B2         5/2014

OTHER PUBLICATIONS

China National Intellectual Property Administration ("CNIPA"), First Rectification Notification for PRC (China) Patent Application No. 202222940422.X, mailed Feb. 2, 2023, 1 page.
(Continued)

*Primary Examiner* — Brian R Ohara
*Assistant Examiner* — Brent C Thomas
(74) *Attorney, Agent, or Firm* — THE MARBURY LAW GROUP PLLC

(57) ABSTRACT

Various embodiments of a reactant feed and return assembly, such as an anode splitter plate (ASP), are provided for facilitating reactant feed flow in a solid oxide fuel cell (SOFC) stack system. Embodiments include a reactant feed and return assembly including at least one nozzle structure along a flow path of a reactant feed to a fuel cell stack. The at least one nozzle structure may include a width dimension that decreases along the flow path of the reactant. The at least one nozzle structure of the assembly may accelerate the reactant feed as it enters the adjacent fuel cell stack and may provide the reactant feed with sufficient kinetic energy to negate the effects of an increase in viscous resistance along the reactant flow path through the fuel cell stack.

19 Claims, 10 Drawing Sheets

(51) Int. Cl.
*H01M 8/2425* (2016.01)
*H01M 8/249* (2016.01)
*H01M 8/12* (2016.01)

(56) References Cited

U.S. PATENT DOCUMENTS

| | | | | |
|---|---|---|---|---|
| 2004/0115508 A1* | 6/2004 | Noto | ............... | H01M 8/04089 |
| | | | | 429/468 |
| 2010/0323270 A1 | 12/2010 | Shibata et al. | | |
| 2017/0104233 A1 | 4/2017 | Armstrong et al. | | |
| 2017/0222236 A1* | 8/2017 | Armstrong | ............ | C22C 19/058 |
| 2019/0319291 A1* | 10/2019 | Cook | ................. | H01M 8/0263 |
| 2021/0043948 A1* | 2/2021 | Cheng | ................ | H01M 8/0265 |

OTHER PUBLICATIONS

EPO Office Communication, Extended European Search Report for Patent Application No. 22205536.0, mailed Dec. 20, 2023, 10 pages.

\* cited by examiner

REACTANT FEED AND RETURN ASSEMBLY FOR FUEL CELL STACKS INCLUDING A NOZZLE STRUCTURE

FIELD

Embodiments of the present disclosure are directed to fuel cell systems in general, and to a feed and return assembly with a nozzle in particular.

BACKGROUND

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell, while a fuel flow is passed through the anode side of the fuel cell. The oxidizing flow is typically air, while the fuel flow can be a hydrocarbon fuel, such as methane, natural gas, hydrogen, propane, ethanol, or methanol. The fuel cell, operating at a typical temperature between 750° C. and 950° C., enables combination of the oxygen and free hydrogen, leaving surplus electrons behind. The excess electrons are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located. Some fuel cell stacks may be internally manifolded for a first reactant (e.g., fuel) and externally manifolded for a second reactant (e.g., air).

A fuel cell power generating system may include one or more fuel cell stacks and a distribution system that provides flow streams of the reactants to the appropriate locations of each fuel cell in the stack(s) and removes exhaust streams from the fuel cells and the stack(s).

SUMMARY

An embodiment includes a reactant feed and return assembly for a fuel cell stack system, comprising a reactant feed opening in the reactant feed and return assembly, a reactant exhaust opening in the reactant feed and return assembly, a reactant feed channel within the reactant feed and return assembly in fluid communication with the reactant feed conduit, at least one nozzle structure in fluid communication with the reactant feed channel and the inlet riser channel of the fuel cell stack, the at least one nozzle structure having a width dimension that decreases along a direction of reactant flow through at least one nozzle structure to the inlet riser channel, and a reactant exhaust channel within the reactant feed and return assembly in fluid communication with the reactant exhaust conduit.

Further embodiments include a fuel cell stack system, comprising a column comprising at least a first fuel cell stack and a second fuel cell stack, and a reactant feed and return assembly located between the first fuel cell stack and the second fuel cell stack in the column. The reactant feed and return assembly is in fluid communication with the first fuel cell stack and the second fuel cell stack and is configured to provide a reactant feed to, and receiving a reactant exhaust from, each of the first fuel cell stack and the second fuel cell stack, and wherein the reactant feed and return assembly comprises at least one nozzle structure along a flow path of the reactant feed, the at least one nozzle structure having a width dimension that decreases along a direction of the flow path of the reactant feed.

DETAILED DESCRIPTION OF THE EMBODIMENTS

The accompanying drawings, which are incorporated herein and constitute part of this specification, illustrate example embodiments of the invention, and together with the general description given above and the detailed description given below, serve to explain the features of the invention.

Figure 1:
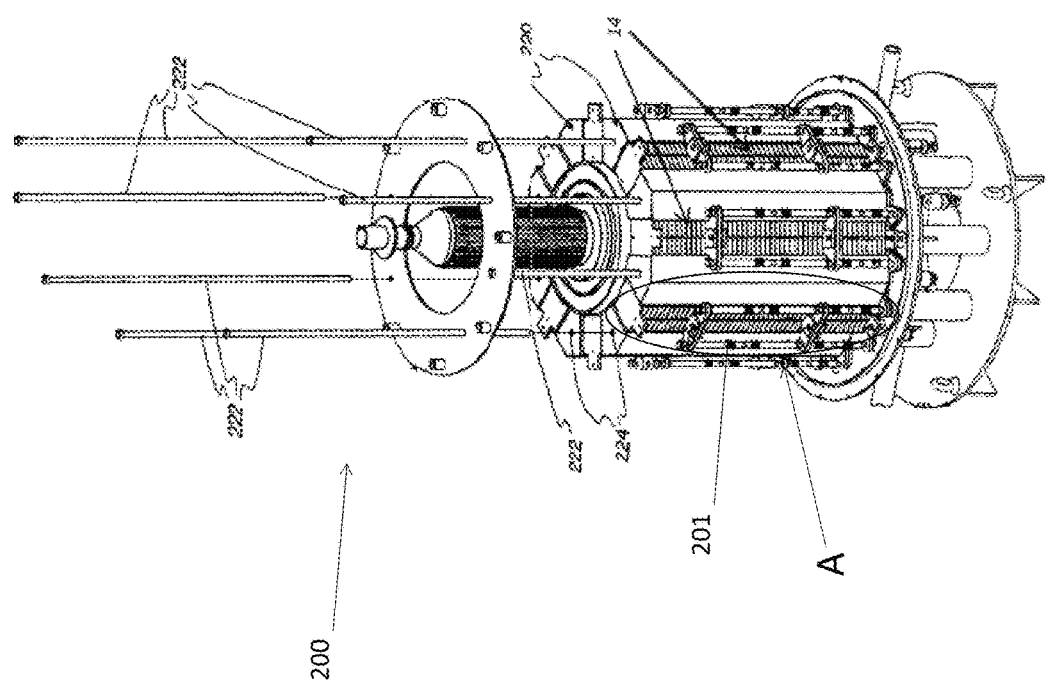
FIG. 1 is a perspective view of a prior art SOFC stack assembly.

FIG. 1 is a perspective partially-exploded view of a prior art SOFC stack assembly 200. In this embodiment, the SOFC stack assembly 200 includes a plurality of fuel cell stacks 14 that are internally manifolded for fuel and externally manifolded for air, although it will be understood that other configurations may be utilized, such as a system that is internally manifolded for air and externally manifolded for fuel, or a system that is internally manifolded for both fuel and air.

As shown in FIG. 1, wedge shaped ceramic side baffles 220 (e.g., having a non-uniform thickness and a roughly triangular cross sectional shape in the horizontal direction) are located between adjacent fuel cell stacks 14 (or columns 201 of fuel cell stacks), one of which is enclosed in area A. The baffles 220 serve to direct the cathode feed into the cathode flow paths and to fill the space between adjacent stacks so that the cathode feed passes through each of the stacks 14, rather than bypassing around the longitudinal sides of the stacks 14. The baffles 220 are held in place by tie rods 222 that pass through closely fitting bores 224 centrally located in each of the baffles 220. Preferably, the baffles 220 are electrically non-conductive and made as one unitary piece from a suitable ceramic material. FIG. 1 also shows fuel distribution manifolds between the stacks in the stack column and fuel inlet and exhaust conduits connected to the manifolds. One skilled in the art will recognize that the embodiments described below are not limited to use in the specific assembly structure illustrated in FIG. 1.

Figure 2:
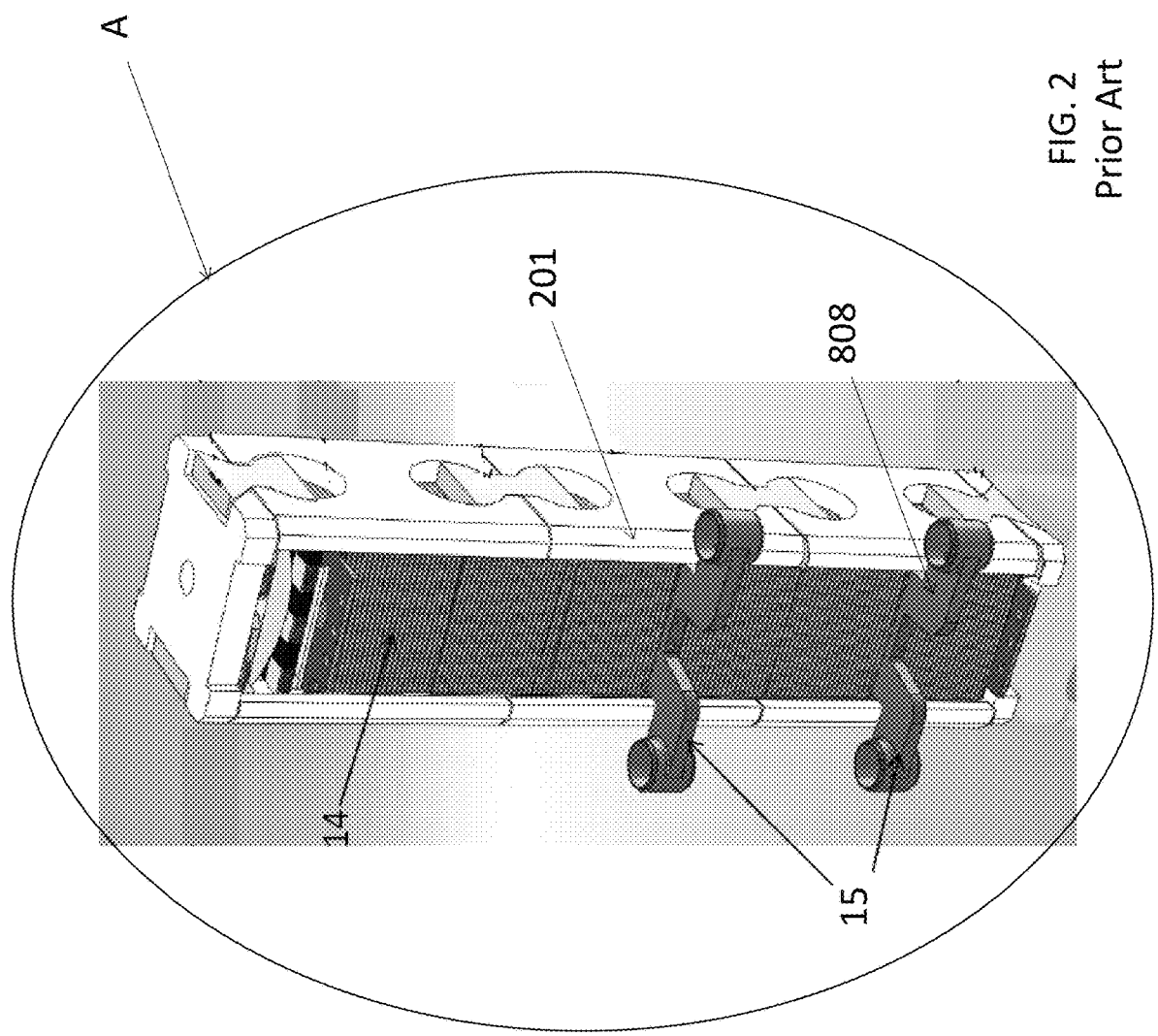
FIG. 2 is a perspective view of a prior art SOFC stack.

FIG. 2 is a perspective view of a column 201 including one or more fuel cell stacks 14 such as indicated in area A of FIG. 1. FIG. 2 shows a plurality of fuel cell stacks 14 each comprising vertically stacked fuel cells. The column 201 may include at least one feed/return assembly 15 for a reactant. For example, for a fuel cell system that is internally manifolded for fuel, the feed/return assembly 15 may be referred to as an anode feed/return assembly 15. The anode feed/return assembly 15 may be coupled to an anode feed port (not shown in FIG. 2) and may direct the anode feed (e.g., a fuel-containing reactant stream) into one or more fuel cell stacks 14 and may collect anode exhaust from the corresponding fuel cell stacks 14 and direct the anode exhaust into an exhaust port (not shown in FIG. 2). An anode feed/return assembly 15 may include a plate-shaped portion located within the column 201, such as between two fuel cell stacks 14 as illustrated in FIG. 2, and may also include fluid connector ports in a projection portion 808 extending out from the column. The anode feed/return assembly 15 may direct anode feed into and collect anode exhaust from multiple fuel cell stacks 14 located above and below the anode reed/return assembly 15 in the column 201. Such an anode feed/return assembly 15 may also be referred to as an anode splitter plate (ASP). Any number of ASPs 15 may be provided between adjacent fuel cell stacks 14 as desired. Further, the number of fuel cell stacks 14 in a column 201 and/or the number of fuel cell stacks 14 between respective ASPs 15 may be selected as desired and is not limited to the configuration shown in FIG. 2.

Figure 3:
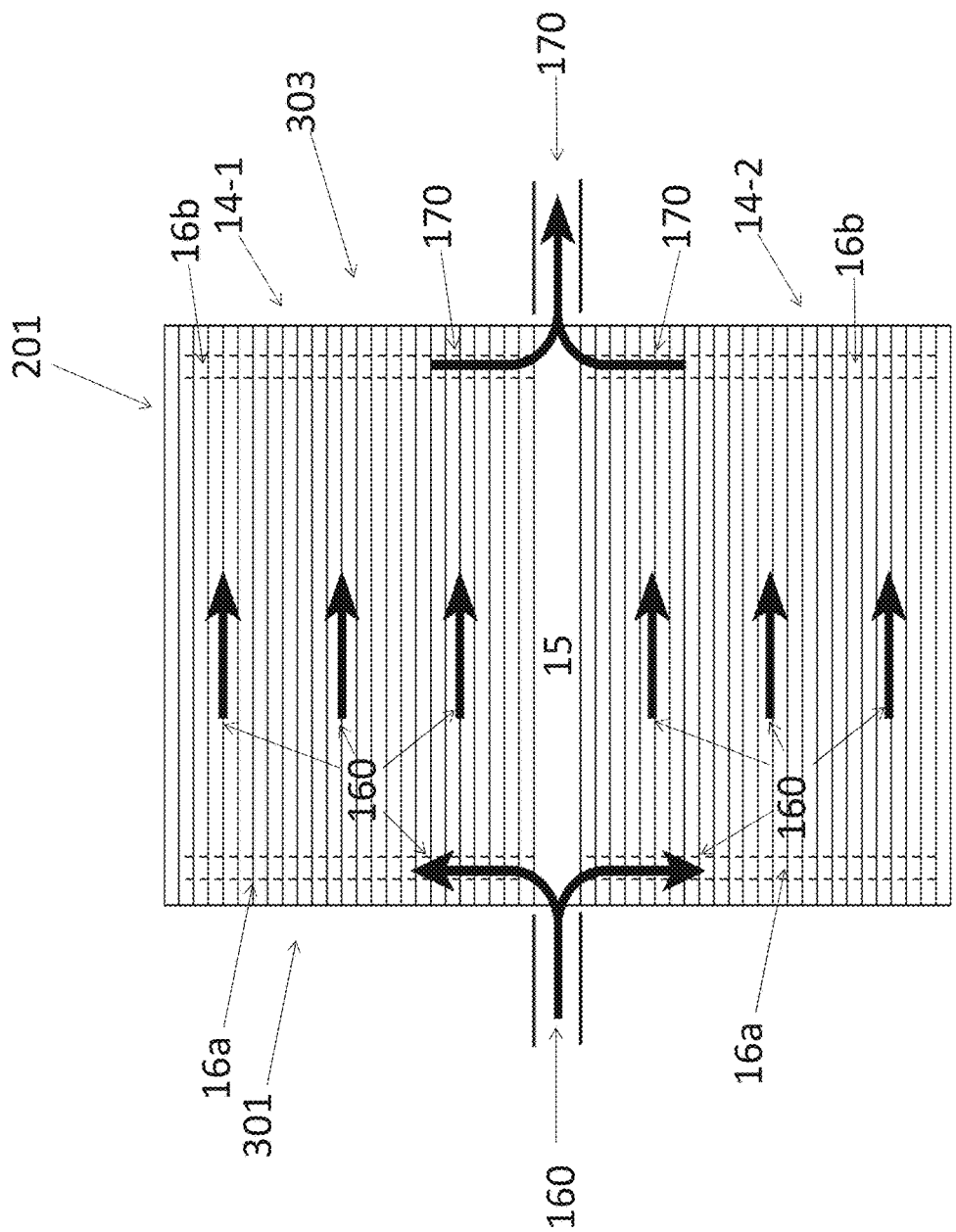
FIG. 3 is a schematic side cross sectional view of a prior art SOFC stack.

FIG. 3 is a schematic side cross sectional view of prior art column 201 which schematically illustrates the reactant flow path through an ASP 15 and multiple fuel cell stacks 14-1, 14-2. Fuel flow is illustrated by solid black arrows 160. Fuel is shown initially entering the ASP 15 from a first side 301 of the column 201, where it is distributed vertically throughout the stacks 14-1, 14-2 (e.g., within inlet riser channels 16a extending through the respective stacks 14-1, 14-2). As the fuel travels through each stack 14-1, 14-2 from the left side to the right side in FIG. 3, at least a portion of the fuel in the reactant stream is reacted in a fuel cell to generate electricity. As illustrated by solid black arrows 170, an exhaust stream including reaction products and any un-reacted fuel is then directed from various positions along the vertical axis of the right side of the stacks 14-1, 14-2 (e.g., through outlet riser channels 16b) to the ASP 15, where it exits from the second side of the column 201. ASP 15 thus manages incoming and outgoing reactant flow 160, 170.

Although FIG. 3 illustrates the fuel and exhaust streams entering and exiting the column 201 on opposite sides 301, 303 of the column 201, it will be understood that in various embodiments the fuel and exhaust streams may enter and exit the column on the same side of the column 201, such as in the configuration shown in FIG. 2. The ASP 15 may include an internal conduit (not shown in FIG. 3) that directs the incoming fuel stream 160 from the first side 301 of the column 201 into the respective inlet riser channels 16a of the stacks 14-1, 14-2. The ASP 15 may also include another internal conduit (not shown in FIG. 3) that directs the exhaust stream 170 from the respective outlet riser channels 16b of the stacks 14-1, 14-2 through the ASP to the first side 301 of the column 201, where the exhaust stream 170 may exit the column 201. The internal conduits of the ASP may be located at least partially within different planes (i.e., into and out of the page in FIG. 3).

Figure 4:
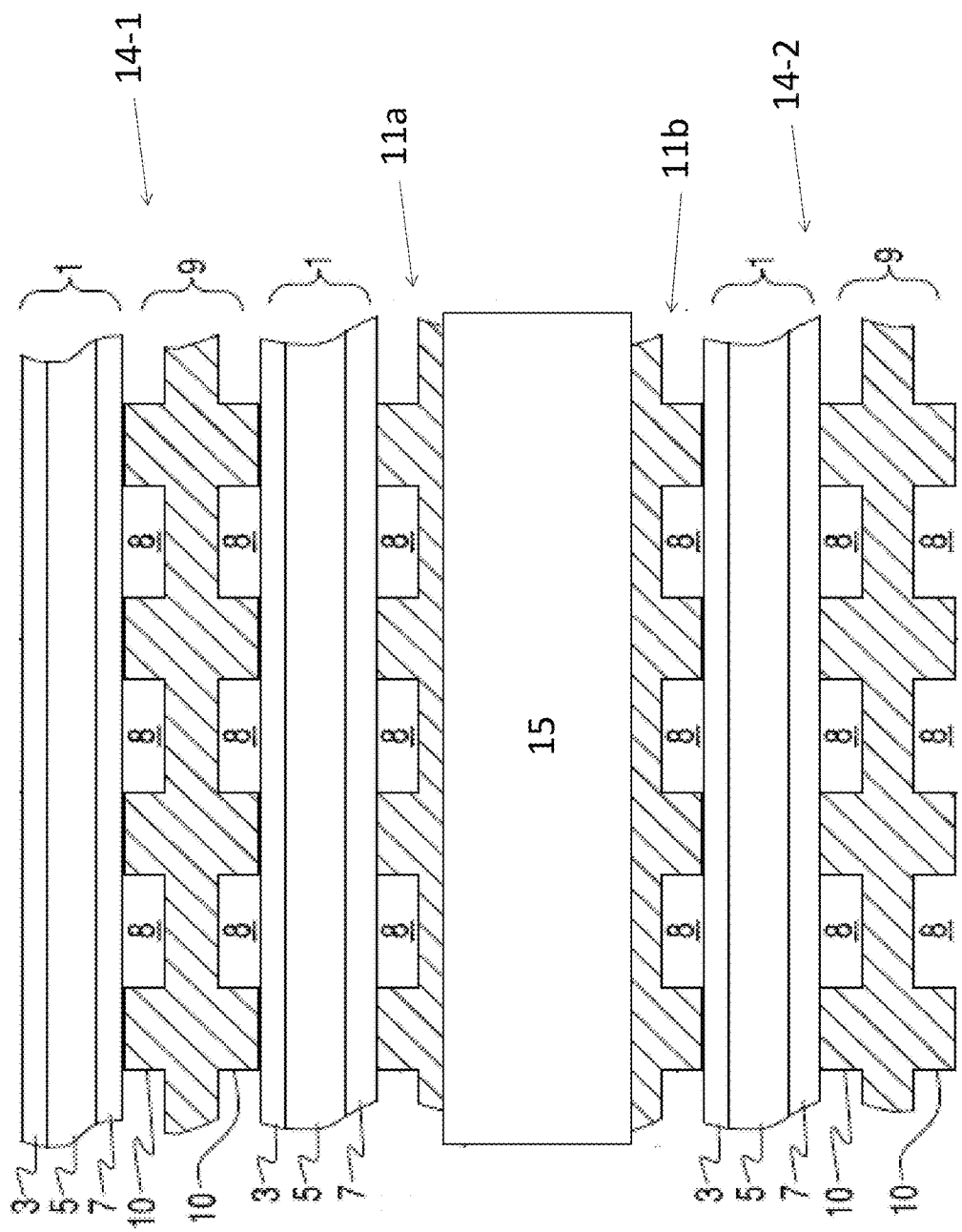
FIG. 4 is a side cross-section view of a prior art SOFC stack.

FIG. 4 is a side cross-sectional view of a portion of a prior art column 201 including a plurality of SOFC stacks 14-1, 14-2 and an ASP 15. The column 201 shown in FIG. 4 is rotated 90 degrees about the vertical axis from the column 201 shown in FIG. 3. Each SOFC 1 within a stack 14-1, 14-2 includes a cathode electrode 7, a solid oxide electrolyte 5, and an anode electrode 3. Fuel cell stacks are frequently built from a multiplicity of SOFC's 1 in the form of planar elements, tubes, or other geometries. Still further, while vertically oriented stacks are shown in FIG. 4, the fuel cells may be stacked horizontally or in any other suitable direction between vertical and horizontal. A major function of fuel cell stacks is to provide fuel and air to the electrochemically active surface, which can be large.

The gas flow separator 9 (referred to as a gas flow separator plate when part of a planar stack), containing gas flow passages or channels 8 between ribs 10, separates the individual cells in the stack. Frequently, the gas flow separator plate 9 is also used as an interconnect which electrically connects the anode or fuel electrode 3 of one cell to the cathode or air electrode 7 of the adjacent cell. In this case, the gas flow separator plate which functions as an interconnect is made of or contains electrically conductive material. The interconnect/gas flow separator 9 separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. At either end of a portion of the stack 14, there may be an air endplate 11a or fuel end plate 11b for providing air or fuel, respectively, to the end electrode. The ASP 15 may be located between fuel cell stacks 14-1, 14-2 and interface with an air or a fuel endplate 11a of a first fuel cell stack 14-1 and an air or a fuel endplate 11b of a second fuel cell stack 14-2.

Figure 5A:
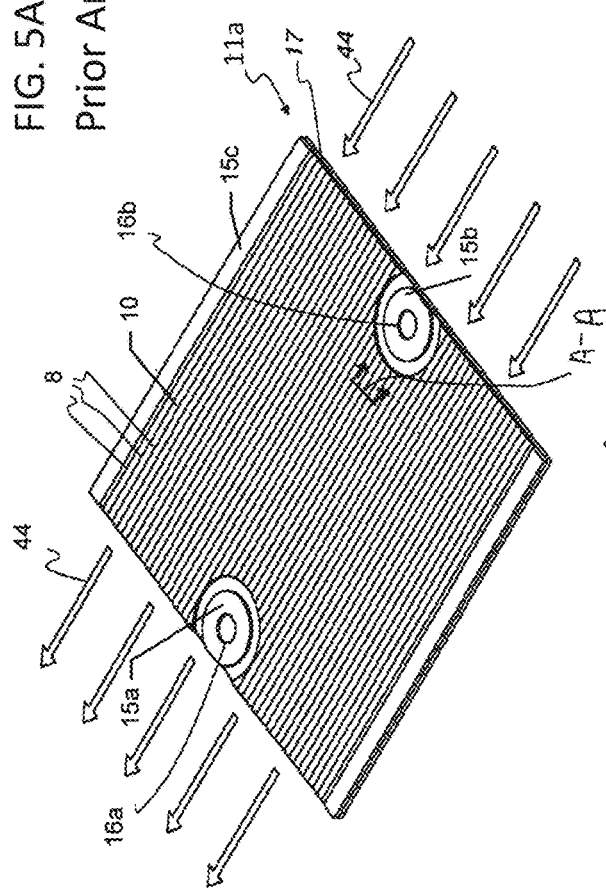
FIGS. 5A-5B are perspective views of prior art fuel flow in SOFC endplates.
Figure 5B:
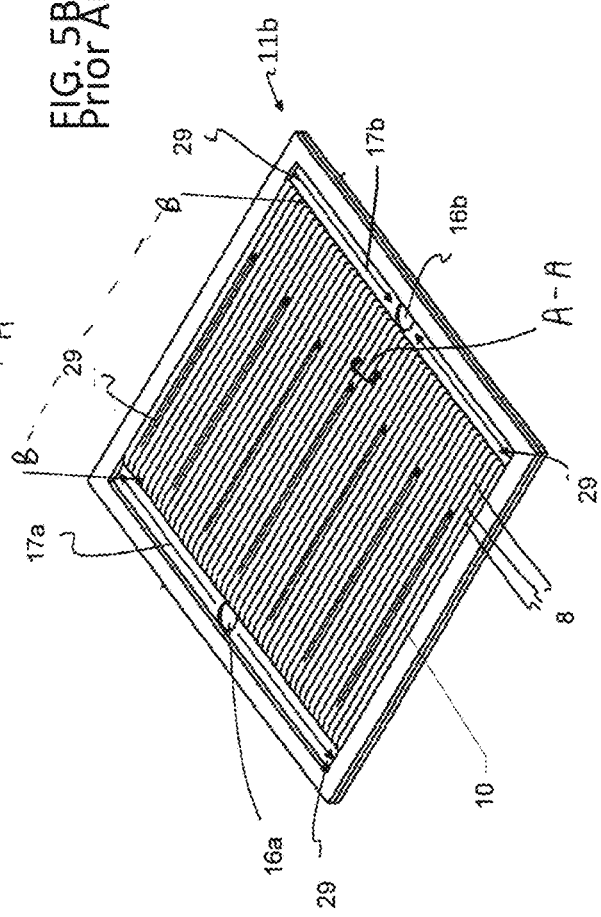

FIGS. 5A-5B are perspective views illustrating the flow of reactants in SOFC endplates 11a,b. FIG. 5A shows the top of air endplate 11a as shown in FIG. 4, and FIG. 5B shows the bottom of fuel endplate 11b as shown in FIG. 4. That is, the sides of endplates 11a,b that are not visible in FIGS. 5A-B are substantially flat and may be in direct contact with ASP 15 (not shown) when provided in SOFC stacks 14-1 and 14-2, as illustrated in FIG. 4.

The portions of endplates 11a,b shown as side cross-sections in FIG. 4 are provided along lines A-A in FIGS. 5A-B. Turning first to FIG. 5B, fuel endplate 11b contains gas flow passages or channels 8 between ribs 10 for directing fuel flow. The fuel endplate 11b in this embodiment includes at least one riser channel 16*a* for providing fuel to the anode-side of a SOFC, as illustrated by arrow 29. The riser channel 16*a* generally comprises a fuel inlet riser opening or hole that extends through at least one layer of the fuel cells and interconnects in the stack. As illustrated in FIG. 5B, the fuel can flow through the inlet riser channel 16*a* to the anode-side of each fuel cell. There, the fuel can collect in an inlet plenum 17*a* (e.g., a groove in the interconnect's surface), then flow over the fuel cell anode 3 through gas flow channels 8 formed in fuel endplate 11*b* to an outlet plenum 17*b* and then exit through a separate outlet riser channel 16*b*.

The air endplate 11*b*, illustrated in FIG. 5A, may include gas flow passages or channels 8 between ribs 10 which direct air flow 44 over the cathode electrode of the fuel cell. Seals 15*a*, 15*b* may seal the respective risers 16*a*, 16*b* on the cathode-sides of the interconnect and fuel cell to prevent fuel from reaching the cathode electrode of the fuel cell. The seals may have a donut or hollow cylinder shape as shown so that the risers 16*a*, 16*b* extend through the hollow middle part of the respective seals 15*a*, 15*b*. The seals 15*a*, 15*b* can include a elevated top surface for contacting against the flat surface of the adjacent SOFC. A peripheral seal 15*c* can seal the anode-side of the fuel cell to prevent air from reaching the anode electrode of the fuel cell. Seals 15*a-c* may comprise glass material. Any of glass seals 15*a-c* may be provided to sufficiently pneumatically isolate the fuel from the air.

Figure 6B:
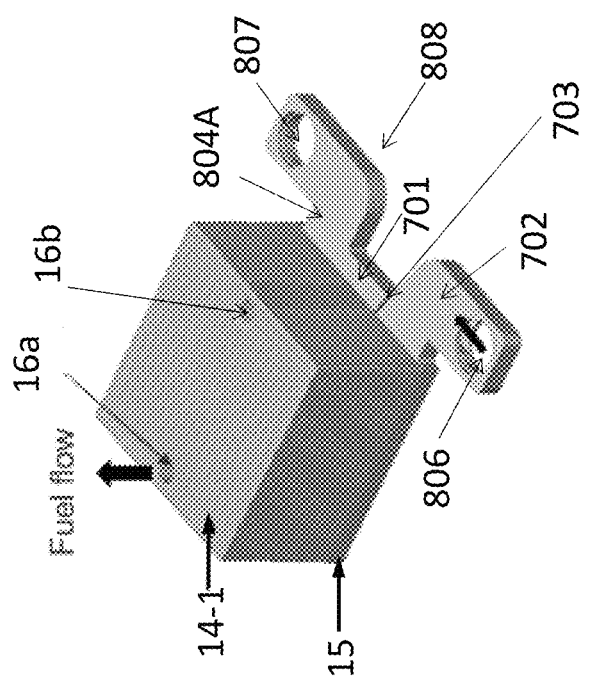
FIG. 6B is a perspective view showing a reactant feed and return assembly and a SOFC stack located over an upper surface of the reactant feed and return assembly.
Figure 6A:
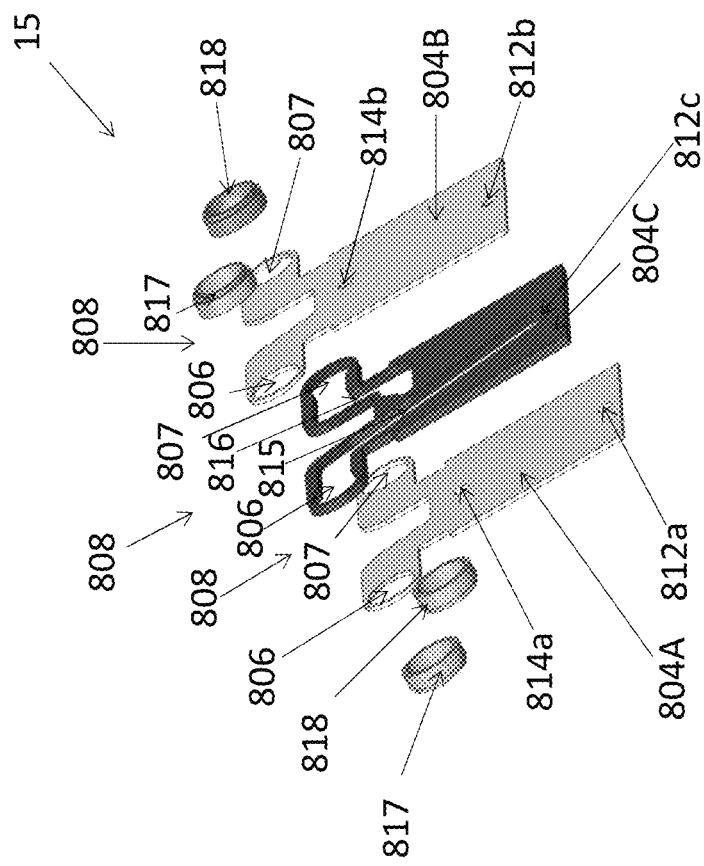
FIG. 6A is an exploded view of a reactant feed and return assembly for use in a column of SOFC stacks.

FIG. 6A is an exploded view of a reactant feed and return assembly 15 that may be used in a column 201 including a plurality of SOFC stacks 14-1, 14-2 such as shown in FIG. 4. In this example, the reactant feed and return assembly is an anode splitter plate (ASP). An ASP 15 such as shown in FIG. 6A may be formed by bonding a plurality of plates together via a suitable bonding process, such as by a welding or brazing process. An ASP may include two or more plates bonded together, such as three plates 804A, 804B and 804C shown in FIG. 6A. It will be understood that an ASP 15 may include more than three plates bonded together. Alternatively, an ASP 15 may include a single, unitary plate member that may include suitable openings and fluid channels within the plate member as described below.

In some ASPs, one or more of the plates 804A, 804B, 804C forming the ASP may have a segmented construction with gaps between respective segments of the plate 804A, 804B, 804C that may allow the segments to "float" independent of one another. FIG. 6B is a perspective view showing an assembled ASP 15 and a SOFC stack 14-1 located over an upper surface of the ASP 15, where the uppermost plate 804A of the ASP 15 includes a plurality of segments 701, 702 with a gap 703 between the segments 701, 702. This segmented construction may help to reduce thermal stresses applied to adjacent components of the SOFC stacks 14-1, 14-2 during thermal cycling. A sealing material may optionally fill the gaps 703 between adjacent segments of the APS plate(s) 804A.

The plates 804A, 804B, 804C of an ASP 15 may be formed of a durable, electrically-conductive material with good resistance to high-temperature oxidation and corrosion, such as grade 446 stainless steel (SS446) sheet metal or an Inconel® alloy. Each of the plates 804A, 804B, 804C of the ASP 15 may be formed of the same material, or may be formed of different materials. In some embodiments, the ASP 15 may be formed of different materials having different coefficients of thermal expansion (CTE), such as described in U.S. Pat. No. 10,511,047, which is incorporated by reference herein. In particular, the outermost portions of the ASP 15 (e.g., plates 804A and 804B) may be formed of a material having a CTE that is between the CTE of an inner portion of the ASP 15 (e.g., plate 804C) and an adjacent component of the SOFC stacks 14-1, 14-2, such as an end plate 11*a*, 11*b* of a SOFC stack 14-1, 14-2 (e.g., a Cr—Fe alloy plate). In some embodiments, all or a portion of the ASP 15 may include a Cr—Fe alloy, and may be fabricated using a sheet metal or powder metallurgy (PM) process.

The ASP 15 may include an inlet riser opening that may be comprised of openings 812*a*, 812*b* and 812*c* formed through each of the plates 804A, 804B and 804C such that when the plates 804A, 804B and 804C are bonded together, the openings 812*a*, 812*b* and 812*c* form a continuous fluid passageway through the ASP 15 through which a reactant (e.g., fuel) may flow. The ASP 15 may also include an outlet riser opening that may be comprised of openings 814*a*, 814*b* and 815*c* formed through each of the plates 804A, 804B and 804C such that when the plates 804A, 804B and 804C are bonded together, the openings 814*a*, 814*b* and 814*c* form a continuous fluid passageway through the ASP 15 through which an exhaust stream may flow. The inlet and outlet riser openings of the ASP 15 may be aligned with the riser channels 16*a*, 16*b* of the SOFC stacks 14-1, 14-2, as shown in FIG. 6B.

Each of the plates 804A, 804B and 804C may also include a projection portion 808 that extends from a side of the plates 804A, 804B and 804C. The projection portions 808 may be configured to extend out from the column 201 of fuel cell stacks 14 when the ASP 15 is assembled in a SOFC system, as shown in FIG. 2. Each projection portion 808 may include a pair of openings 806 and 807 extending through the projection portion 808 such that when the plates 804A, 804B and 804C are bonded together, the openings 806, 807 form a pair of continuous fluid passageways extending through the projection portion 808 of the ASP 15. Opening 806 may provide a reactant feed opening of the ASP 15, and opening 807 may provide a reactant exhaust opening of the ASP 15.

Plate 804C may include an open region 815 extending continuously between opening 806 and opening 812*c* such that when the plates 804A, 804B and 804C are bonded together, the open region 815 may form a first internal conduit extending between the reactant feed opening 806 and the inlet riser opening 812*a-c* of the ASP 15. Plate 804C may also include an open region 816 extending between opening 807 and opening 814*c* such that when the plates 804A, 804B and 804C are bonded together, the open region 816 may form a second internal conduit extending between the reactant exhaust opening 807 and the outlet riser opening 814*a-c* of the ASP 15. Reactant (e.g., anode) feed tubes 817 may be bonded to, or integrally formed with, the projection portion 808 of the ASP 15 over the reactant feed opening 806, and reactant exhaust tubes 818 may be bonded to, or integrally formed with, the projection portion 808 of the ASP 15 over the reactant exhaust opening 807.

A reactant (e.g., fuel) from a reactant feed tube 817 may flow into the reactant feed opening 806 in the projection portion 808 of the ASP 15 and through the first internal fluid conduit 815 to the inlet riser opening 812*a-c*. From there, the reactant may flow through the inlet riser opening 812*a-c* into the inlet riser channels 16*a* of fuel cell stacks 14-1 and 14-2 located above and below the ASP 15 in the column 201 (see FIG. 2). Reactant (i.e., anode) exhaust from the fuel cell stacks 14-1 and 14-2 may flow from the outlet riser channels 16*b* of the fuel cell stacks 14-1 and 14-2 into the outlet riser opening 814*a-c* of the ASP 15 through the second internal fluid conduit 816 to the reactant exhaust opening 807 in the projection portion 808 of the ASP 15, and out through a reactant exhaust tube 818.

Referring again to FIG. 2, a column 201 of fuel cell stacks 14 may include a reactant feed and return assembly 15, such as the ASP 15 shown in FIGS. 6A-6B providing reactant (i.e., fuel) to, and removing reactant exhaust from, a pair of fuel cell stacks 14-1, 14-2 located above and below the reactant feed and return assembly 15 in the column 201. Accordingly, each fuel cell stack 14 within the column 201 may abut a reactant feed and return assembly 15 on one end of the fuel cell stack 14 (e.g., at an ASP-to-stack interface), and some of the fuel cell stacks 14 in the column 201 may abut another fuel cell stack 14 of the column 201 at the other end of the fuel cell stack 14 (i.e., at a stack-to-stack interface).

Figure 7:
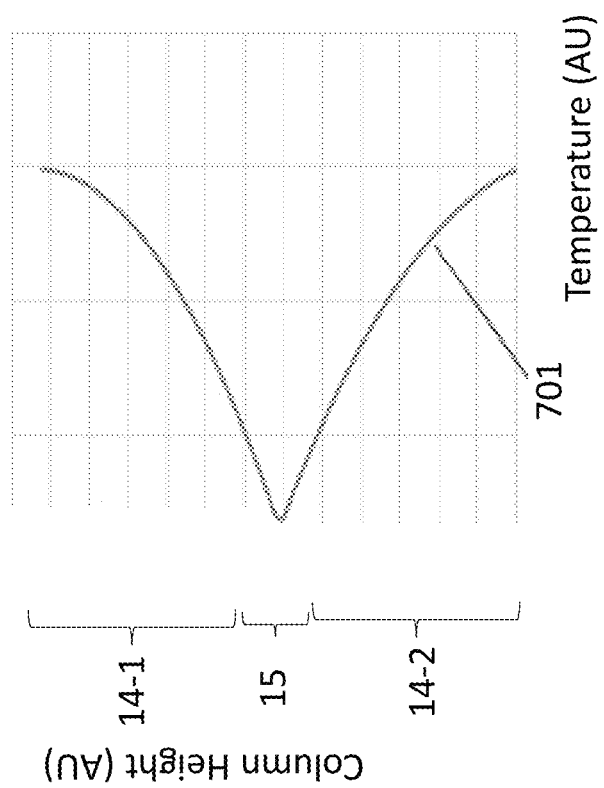
FIG. 7 is a plot of a temperature profile as a function of column height of a pair of fuel cell stacks that are separated in the column by the anode reactant feed and return assembly of FIG. 6B.

In a SOFC stack assembly 200 as shown and described above with reference to FIGS. 1-6B, the temperature of the fuel cell stacks 14 is not uniform. In general, the temperature within the fuel cell stacks 14 increases as a function of distance from the adjacent reactant feed and return assembly 15 (e.g., the distance from an ASP-to-stack interface). The highest temperatures within the fuel cell stacks 14 are often at the interface between the fuel stack 14 and an adjacent fuel cell stack (i.e., at a stack-to-stack interface). This is illustrated in FIG. 7. Specifically, FIG. 7 illustrates the temperature profile 701 of a pair of fuel cell stacks 14-1, 14-2 that are separated in the column by the ASP 15. The lowest temperatures of the stacks are adjacent to the ASP, with the stack temperatures increasing as a function of distance from the ASP and reaching a maximum at the opposite end of the stack, where the stack interfaces with an adjacent stack of the column. This large differential in stack temperature may also result in an undesirable variation in the fuel utilization (FU) throughout the fuel cell stack. In particular, the viscous resistance to fuel flow within the fuel cell stack increases with increasing stack temperature such that at the high stack temperatures close to a stack-to-stack interface, the fuel (such as hydrogen fuel) lacks sufficient kinetic energy to overcome the increase in viscous resistance. Accordingly, less fuel is able to flow to the fuel cells near the stack-to-stack interface and more fuel flows to the fuel cells closest to the ASP. This may result in higher fuel utilization (FU) near the stack-to-stack interface than near the ASP-to-stack interface of the fuel cell stack, and in some cases can result in fuel starvation in one or more fuel cells of the stack near the stack-to-stack interface.

Various embodiments of the present disclosure are directed to reactant feed and return assemblies, such as anode splitter plates (ASP), that may minimize the effect of an increase in viscous resistance along the reactant (e.g., fuel) flow path of the fuel cell stacks. In one embodiment, the fuel may comprise hydrogen. In another embodiment, the fuel may comprise a hydrocarbon fuel, such as natural gas, pentane, methane, etc., or a mixture of hydrogen and hydrocarbon fuel. In various embodiments, a reactant feed and return assembly may include at least one nozzle structure, such as a pair of nozzle structures, in the flow path(s) of the reactant feed to the adjacent fuel cell stack(s). Each nozzle structure of the assembly may include a gradual decrease in a width dimension of the nozzle structure along the direction of the flow path of the reactant feed. The nozzle structure(s) may be configured to accelerate the reactant feed as it enters the adjacent fuel cell stack and may provide the reactant with sufficient kinetic energy to negate the effects of an increase in viscous resistance along the reactant flow path through the fuel cell stack.

Figure 8B:
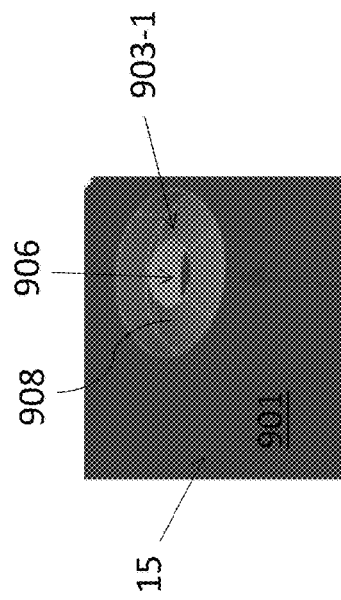
FIG. 8B is a partial cutaway view of the assembly showing region B of FIG. 8A.
Figure 8C:
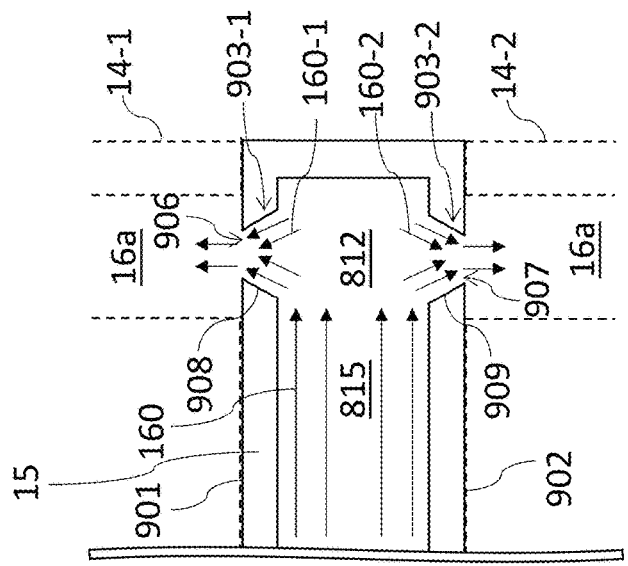
FIG. 8C is a partial side cross-section view of the assembly along line C-C' in FIG. 8A.
Figure 8A:
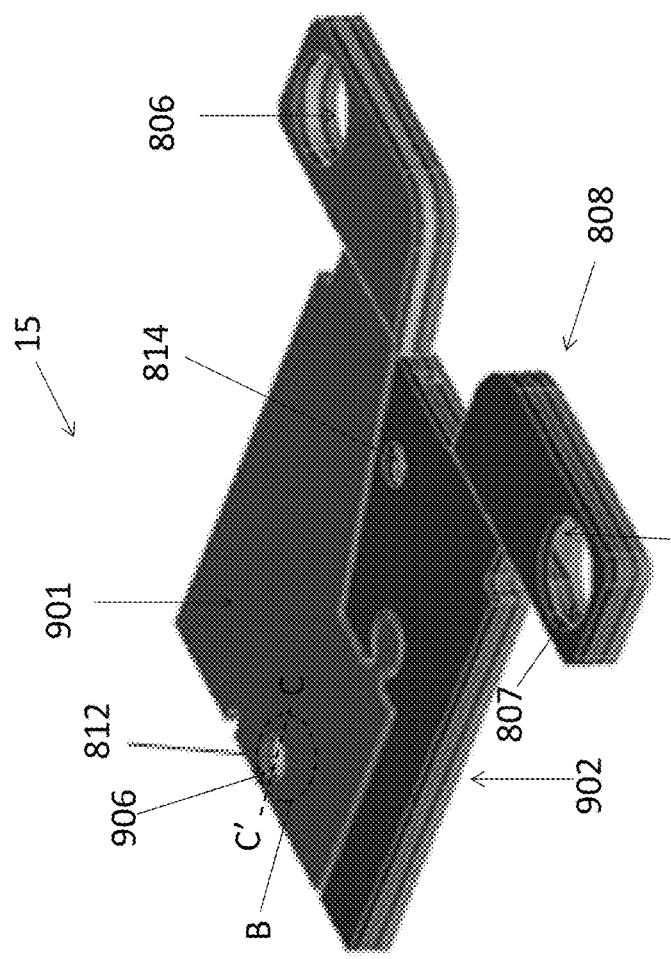
FIG. 8A is a top perspective view of an anode reactant feed and return assembly according to an embodiment of the present disclosure.

FIG. 8A is a top perspective view of an anode reactant feed and return assembly 15 according to an embodiment of the present disclosure. FIG. 8B is a partial cutaway view of the assembly 15 showing region B of FIG. 8A. FIG. 8C is a partial side cross-section view of the assembly 15 along line C-C' in FIG. 8A. Referring to FIGS. 8A-8C, the anode reactant feed and return assembly 15 may be an anode splitter plate (ASP) such as shown and described above with reference to FIGS. 6A and 6B. One or more ASPs 15 as shown in FIGS. 8A-8C may be located in a column 201 between two fuel cell stacks 14, such as stacks 14-1 and 14-2 shown in FIGS. 2, 3 and 4. A first surface 901 of the ASP may face a first fuel cell stack 14-1 (see FIG. 3) of the column 201 and a second surface 902 may face a second fuel cell stack 14-2 of the column 201. In some embodiments, the first and second surfaces 901 and 902 of the ASP 15 may directly contact end plates 11a, 11b of the respective fuel cell stacks 14-1 and 14-2. The ASP 15 may include an inlet riser opening 812 and an outlet riser opening 814 that may extend through the ASP 15. When the ASP 15 is located within the column 201, the inlet riser opening 812 of the ASP 15 may be in fluid communication with respective inlet riser channels 16a of the adjacent fuel cell stacks 14-1 and 14-2. In addition, the outlet riser opening 814 of the ASP 15 may be in fluid communication with respective outlet riser channels 16b of the adjacent fuel cell stacks 14-1 and 14-2. Thus, the inlet riser opening 812 through the ASP 15 may provide a fluid channel that is continuous with the inlet riser channels 16a of the internally-manifolded fuel cell stacks 14 of the column 201, and the outlet riser opening 814 through the ASP 15 may provide a fluid channel that is continuous with the outlet riser channels 16b of the internally-manifolded fuel cell stacks 14 of the column 201.

The ASP 15 may include a projection portion 808 that may extend laterally out from the column 201 of fuel cell stacks 14 when the ASP 15 is located in the column 201. The projection portion 808 may include a reactant feed opening 806 extending through the ASP 15 and a reactant outlet opening 807 extending through the ASP 15. A first internal fluid conduit 815 within the ASP 15 may extend between the reactant inlet opening 806 and the inlet riser opening 812. A second internal fluid conduit 816 may extend within the ASP between the reactant outlet opening 807 and the outlet riser opening 814. A pair of reactant feed tubes (not shown in FIGS. 8A-8C) may be coupled to the projection portion 808 on the first surface 901 and the second surface 902 of the ASP 15 and may be fluidly connected to the reactant inlet opening 806. In addition, a pair of reactant exhaust tubes (not shown in FIGS. 8A-8C) may be coupled to the projection portion 808 on the first surface 901 and the second surface 902 of the ASP and may be fluidly connected to the reactant exhaust opening 807.

Accordingly, during operation of a SOFC stack assembly, reactant (e.g., fuel) from a reactant feed tube may flow into the reactant feed opening 806 and through the first internal fluid conduit 815 to the inlet riser opening 812. As shown in the cross-section view of FIG. 8C, when the reactant flow (indicated by solid black arrows 160) reaches the inlet riser opening 812, the reactant flow may bifurcate, such that a first portion of the reactant flow (indicated by arrows 160-1) may flow in a first direction through the inlet riser opening 812 and exit the ASP 15 through an outlet 906 in the first (e.g., upper) surface 901 of the ASP 15, and a second portion of the reactant flow (indicated by arrows 160-2) may flow in a second direction through the inlet riser opening 812 and exit the ASP 15 through an outlet 907 in the second (e.g., lower) surface 902 of the ASP 15. The portion of the reactant flow 160-1 that exits the ASP 15 through outlet 906 may enter the inlet riser channel 16a of fuel cell stack 14-1 (indicated in dashed lines in FIG. 8C), and the portion of the reactant flow 160-2 that exits the ASP 15 through outlet 907 may enter the inlet riser channel 16a of fuel cell stack 14-2 (indicated in dashed lines in FIG. 8C).

In various embodiments, the inlet riser opening 812 of the ASP 15 may include at least one nozzle structure, and preferably a pair of nozzle structures 903-1 and 903-2, located in the reactant flow path(s) through the inlet riser opening 812. Referring to FIG. 8C, a first nozzle structure 903-1 may be formed by a sidewall 908 of the inlet riser opening 812 having a tapered shape such that a width dimension of the inlet riser opening 812 may gradually decrease along the direction of reactant flow 160-1 towards the outlet 906 in the first (e.g., upper) surface 901 of the ASP 15. A second nozzle structure 903-2 may be formed by a sidewall 909 of the inlet riser opening 812 having a tapered shape such that a width dimension of the inlet riser opening 812 may gradually decrease along the direction of reactant flow 160-2 towards the outlet 907 in the second (e.g., lower) surface 902 of the ASP 15. FIG. 8B is a partial cutaway view of the ASP 15 in which a portion of the ASP 15 surrounding outlet 906 is removed to illustrate the shape of the sidewall 908 of the inlet riser opening 812 forming the first nozzle structure 903-1. In the embodiment shown in FIGS. 8A-8C, the nozzle structures 903-1 and 903-2 have a shape of a conical frustum having a width dimension (i.e., diameter) that is convergent along the direction of reactant flow 160-1 and 160-2 through the respective nozzle structures 903-1 and 903-2. It will be understood that the nozzle structures 903-1 and 903-2 in various embodiments may have different shapes, such as a pyramidal frustum, a spherical segment, an ovoid segment, or any other shape having a convergent width dimension along the direction of reactant flow 160-1 and 160-2. In various embodiments, the nozzle structures 903-1 and 903-2 may accelerate the flow of the reactant 160 as it exits the ASP 15 through outlets 906 and 907, respectively. Accordingly, the reactant 160 that is accelerated by the nozzle structures 903-1 and 903-2 before entering the inlet riser channels 16a of the adjacent fuel cell stacks 14-1 and 14-2 may have sufficient kinetic energy to overcome an increase in viscous resistance along the reactant flow path through the fuel cell stacks 14-1 and 14-2.

Figure 9:
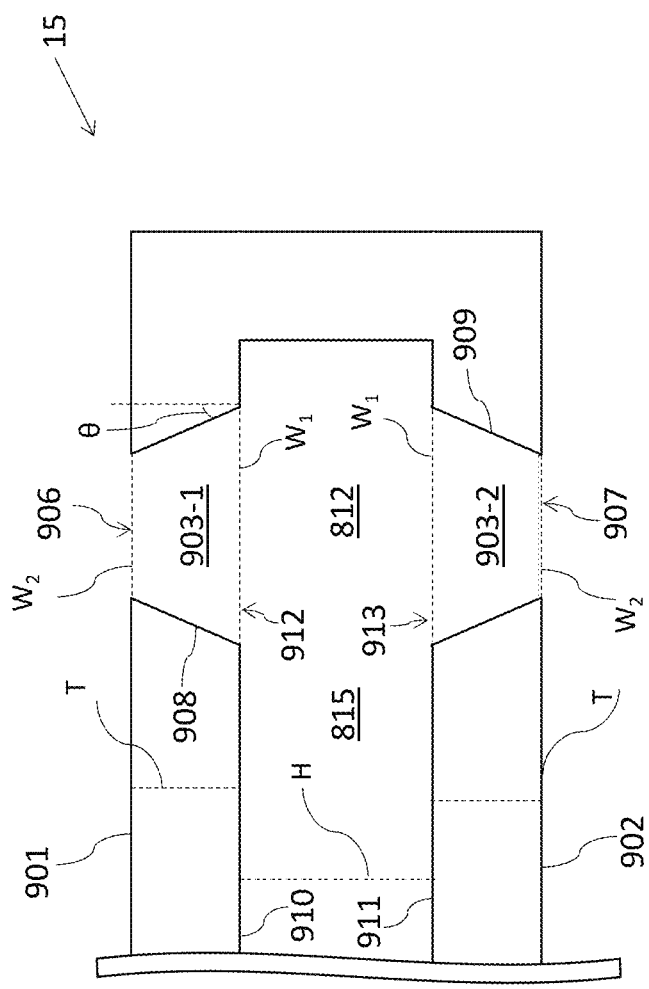
FIG. 9 is a partial side cross-section view of an anode reactant feed and return assembly according to an embodiment of the present disclosure.

FIG. 9 is a partial cross-section view of a portion of an ASP 15 without arrows indicating the reactant flow to more clearly illustrate the nozzle structures 903-1 and 903-2 in the inlet riser opening 812 of the ASP 15 according to an embodiment of the present disclosure. Referring to FIG. 9, the first internal fluid conduit 815 may be located between a first (i.e., upper) interior wall 910 and a second (i.e., lower) interior wall 911 of the ASP 15. A distance between the upper interior wall 910 and the lower interior wall 911 may define a height dimension, H, of the first internal fluid conduit 815. A first nozzle structure 903-1 in the inlet riser opening 812 may have an entrance 912 that is defined by an opening in the upper interior wall 910 of the ASP 15. A second nozzle structure 903-2 in the inlet riser opening 812 may have an entrance 913 that is defined by an opening in the lower interior wall 911 of the ASP 15. The entrances 912 and 913 to the nozzle structures 903-1 and 903-2 may have a width dimension, $W_1$. In some embodiments, the width dimension $W_1$ of the entrances 912 and 913 to the nozzle structures 903-1 and 903-2 may be greater than the height dimension H of the first internal fluid conduit 815. In some embodiments, the width dimension $W_1$ of the entrances 912 and 913 to the nozzle structures 903-1 and 903-2 may be less than the widths of the inlet riser channels 16a of the adjacent fuel cell stacks 14-1 and 14-2 (see FIG. 8C).

Within the nozzle structures 903-1 and 903-2, the width dimension of the nozzle structures 903-1 and 903-2 may be defined by at least one sidewall 908 and 909. In the embodiment shown in FIG. 9, the sidewalls 908 and 909 of the nozzle structures 903-1 and 903-2 may be curved sidewalls that extend continuously around the entire periphery of the nozzle structures 903-1 and 903-2. In other embodiments, multiple sidewalls may extend around the periphery of the nozzle structures 903-1 and 903-2, such that the nozzle structures 903-1 and 903-2 may have a polygonal cross-section shape. As shown in FIG. 9, the at least one sidewall 908 and 909 of each nozzle structure 903-1 and 903-2 may be angled or curved along the direction of reactant flow such that the width dimensions of the nozzle structures 903-1 and 903-2 gradually decreases along the lengths of the nozzle structures 903-1 and 903-2 between their respective entrances 912 and 913 and outlets 906 and 907. In the embodiment shown in FIG. 9, the sidewalls 908 and 909 of the nozzle structures 903-1 and 903-2 have a convergence angle, θ, relative to a vertical direction. In various embodiments, the convergence angle θ of the at least one sidewall 908, 909 of a nozzle structure 903-1, 903-2 may be between about 10° and about 45°, such as between about 15° and about 35°, including about 26°.

The outlets 906 and 907 of the nozzle structures 903-1 and 903-2 may have a width dimension, $W_2$, that is less than the width dimension, $W_1$, of the entrances 912 and 913 of the nozzle structures 903-1 and 903-2. In various embodiments, the width dimension $W_2$ of the outlets 906 and 907 of the nozzle structures 903-1 and 903-2 may be at least about 20% less, such as 30-50% less, including about 40% less, than the width dimension, $W_1$, of the entrances 912 and 913 of the nozzle structures 903-1 and 903-2. In some embodiments, the width dimension $W_2$ of the outlets 906 and 907 of the nozzle structures 903-1 and 903-2 may be less than the height dimension, H, of the first internal fluid conduit 815. Each of the nozzle structures 903-1 and 903-2 may have a length dimension between the respective entrances 912 and 913 and outlets 906 and 907 of the nozzle structures 903-1 and 902-1 that is defined by a thickness, T, of the ASP 15 between the respective outer surfaces 901 and 902 and an interior wall 910 and 911 of the ASP 15. In some embodiments, the thickness T may be less than the width dimension $W_2$ of the outlets 906 and 907 of the nozzle structures 903-1 and 903-2.

In one non-limiting embodiment, the height dimension, H, of the first internal fluid conduit 815 may be 3 to 8 nm, such 5 to 6 mm, the width dimension, $W_1$, of the entrances 912 and 913 of the nozzle structures 903-1 and 903-2 may be 4 to 10 mm, such as 6 to 7 mm, the width dimension, $W_2$, of the outlets 906 and 907 of the nozzle structures 903-1 and 903-2 may be 2 to 6 mm, such as 4 to 5 mm, and the length dimension of each of the nozzle structures 903-1 and 903-2 (defined by thickness, T) may be 1 to 4 mm, such as 2 to 3 mm. In the embodiment shown in FIG. 9, each of the nozzle structures 903-1 and 903-2 includes an identical size and shape, although it will be understood that the nozzle structures 903-1 and 903-2 may have different sizes and/or shapes. Further, although the reactant feed and return assembly 15 (e.g., an ASP) shown in FIGS. 8A-9 includes a pair of nozzle structures 903-1 and 903-2 located in an inlet riser opening 812, it will be understood that a reactant feed and return assembly 15 according to various embodiments may include more than two nozzle structures 903, or may have a single nozzle structure 903. For example, an ASP 15 as described above may include an inlet riser opening 812 having a nozzle structure 903-1 along one reactant flow path into one adjacent fuel cell stack 14-1 and may have a conventional (i.e., untapered) opening with straight, vertically-extending sidewall(s) along a second reactant flow path into another adjacent fuel cell stack 14-2.

A reactant feed and return assembly 15 having at least one nozzle structure 903-1 and 903-2 such as shown in FIGS. 8A-9 may help to ensure that adequate fuel reaches all of the fuel cells of the adjacent fuel cell stacks 14-1 and 14-2, including fuel cells that are near a "stack-to-stack" interface. A fuel cell stack assembly including an embodiment reactant feed and return assembly 15 may reduce the difference in fuel utilization (FU) in different portions of the fuel cell stacks 14-1 and 14-2, compared to a fuel cell stack assembly having a conventional reactant feed and return assembly.

Figure 10:
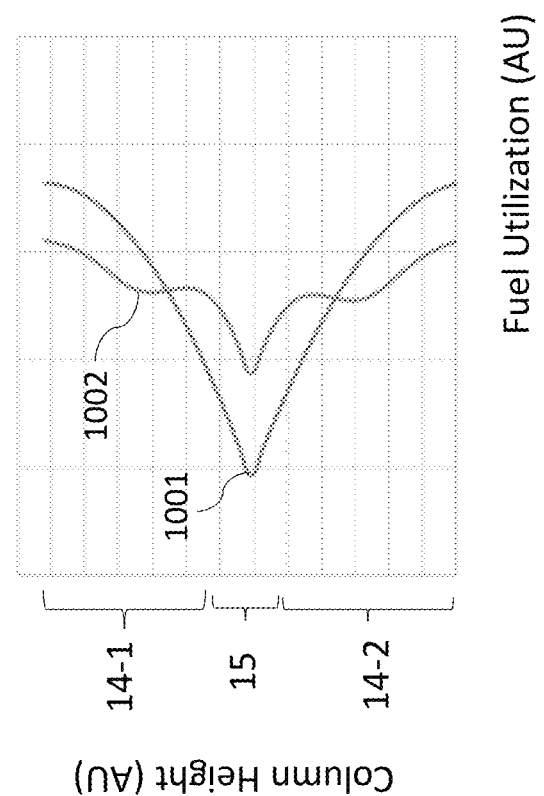
FIG. 10 is plot showing comparative fuel utilization (FU) distributions of the fuel cell stacks as a function of column height using a comparative anode feed and return assembly and an anode feed and return assembly according to an embodiment of the present disclosure.

FIG. 10 shows a plot of the fuel utilization as a function of column height in pair of fuel cell stacks 14-1 and 14-2 that are separated in a column by an anode splitter plate 15. Line 1001 corresponds to a FU of a comparative ASP that lacks nozzles, while line 1002 corresponds to an embodiment ASP 15 having a pair of nozzle structures 903-1 and 903-2 in the inlet riser opening 812. As shown in FIG. 10, the difference between the maximum and minimum fuel utilization values (i.e., FU Max–FU min) for the fuel cell stacks using an embodiment ASP is less than half of the difference between maximum and minimum fuel utilization values in the fuel cell stacks using the comparative ASP.

Accordingly, using an embodiment reactant feed and return assembly 15 (e.g., ASP) having at least one nozzle structure 903-1 and 903-2 as described above may provide a more uniform FU as a function of column height, and maximum fuel utilization (FU) value that is much closer to the intended FU set point. This may permit operation of the fuel cell stacks and/or the hot box containing the fuel cell stacks at a higher FU set point without risking fuel starvation in any of the fuel cells of the stack(s). In some embodiments, the FU set point of the stack(s) may be increased by at least 1%, such as at least about 1.5% (e.g., ~1.6%) without affecting the performance of the cells, thereby increasing the efficiency of the system. Further, the gain in max FU may be achieved without a significant spike in reactant pressure for the fuel cells closest to the ASP. The more uniform FU as a function of column height also leads to a more uniform output voltage profile as a function of the column height.

Fuel cell systems of the embodiments of the present disclosure are designed to reduce greenhouse gas emissions and have a positive impact on the climate.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell stack system, comprising:
   a fuel cell stack comprising an end plate having an inlet riser channel opening and an outlet riser channel opening extending through the end plate; and
   a reactant feed and return assembly having an outer surface that is adjacent to the end plate of the fuel cell stack, the reactant feed and return assembly comprising:
   a reactant feed opening in the reactant feed and return assembly;
   a reactant exhaust opening in the reactant feed and return assembly;
   a reactant feed channel within the reactant feed and return assembly in fluid communication with the reactant feed opening;
   a nozzle structure located between the reactant feed channel and an opening in the outer surface of the reactant feed and return assembly, the nozzle structure having a width dimension that decreases along a direction of reactant flow through the at least one nozzle structure to the opening in the outer surface of the reactant feed and return assembly, wherein the opening in the outer surface of the reactant feed and return assembly is adjacent to the inlet riser channel opening in the end plate of the fuel cell stack, and a width of the opening in the outer surface of the reactant feed and return assembly is less than a width of the inlet riser channel opening; and
   a reactant exhaust channel within the reactant feed and return assembly in fluid communication with the reactant exhaust opening.

2. The fuel cell stack system of claim 1, wherein:
   the reactant feed and return assembly comprises an anode splitter plate (ASP); and
   the nozzle structure comprises a first nozzle structure and the reactant feed and return assembly comprises a second nozzle structure in fluid communication with the reactant feed channel.

3. The fuel cell stack system of claim 2, wherein the reactant feed channel is located between a first interior wall and a second interior wall of the reactant feed and return assembly, and wherein an opening in the first interior wall defines an entrance to the first nozzle structure and an opening in the second interior wall defines an entrance to the second nozzle structure.

4. The fuel cell stack system of claim 3, wherein:
   a width dimension of the opening in the first interior wall of the reactant feed and return assembly is greater than a width dimension of the opening in the first outer surface of the reactant feed and return assembly; and
   a width dimension of the opening in the second interior wall of the reactant feed and return assembly is greater than a width dimension of the opening in the second outer surface of the reactant feed and return assembly.

5. The fuel cell stack system of claim 4, wherein the width dimensions of the openings in the first and second outer surfaces of the reactant feed and return assembly are 30-50% less than the width dimensions of the openings in the first and second interior walls of the reactant feed and return assembly.

6. The fuel cell stack system of claim 4, wherein a height dimension between the first interior wall and the second interior wall of the reactant feed and return assembly is greater than the width dimensions of the openings in the first and second outer surfaces of the reactant feed and return assembly.

7. The fuel cell stack system of claim 4, wherein the height dimension between the first interior wall and the second interior wall of the reactant feed and return assembly is less than the width dimensions of the openings in the first and second interior walls of the reactant feed and return assembly.

8. The fuel cell stack system of claim 4, wherein:
the outer surface of the reactant feed and return assembly comprises a first outer surface of the reactant feed and return assembly;
the first nozzle structure comprises at least one sidewall that is angled or curved to provide a gradual decrease in the width dimension of the first nozzle structure between the opening in the first interior wall and the opening in the first outer surface of the reactant feed and return assembly; and
the second nozzle structure comprises at least one sidewall that is angled or curved to provide a gradual decrease in the width dimension of the second nozzle structure between the opening in the second interior wall and an opening in a second outer surface of the reactant feed and return assembly that is opposite the first outer surface of the reactant feed and return assembly.

9. The fuel cell stack system of claim 8, wherein the at least one sidewall of the first nozzle structure and the at least one sidewall of the second nozzle structure have a convergence angle between 15° and 35° relative to vertical.

10. The fuel cell stack system of claim 1, wherein the fuel cell stack comprises a first fuel cell stack having a first end plate having a first inlet riser channel opening and a first outlet riser channel opening extending through the first end plate, and the outer surface of the reactant feed and return assembly that is adjacent to the first end plate of the first fuel cell stack comprises a first outer surface of the reactant feed and return assembly, and the fuel cell stack system further comprises a second fuel cell stack comprising a second end plate having an inlet riser channel opening and an outlet riser channel opening extending through the second end plate, and
a second outer surface of the reactant feed and return assembly is located adjacent to the second end plate of the second fuel cell stack.

11. The fuel cell stack system of claim 10, wherein:
the nozzle structure comprises a first nozzle structure in fluid communication with the reactant feed channel and the first inlet riser channel of the first fuel cell stack and the reactant feed and return assembly further comprises a second nozzle structure in fluid communication with the reactant feed channel and a second inlet riser channel of the second fuel cell stack;
the first nozzle structure has a width dimension that decreases along a direction of reactant flow through at least one nozzle structure to the first inlet riser channel; and
the second nozzle structure has a width dimension that decreases along a direction of reactant flow through the at least one nozzle structure to the second inlet riser channel.

12. The fuel cell stack system of claim 11, further comprising:

a reactant feed conduit fluidly connected to the reactant feed opening; and
a reactant exhaust conduit fluidly connected to the reactant exhaust opening.

13. The fuel cell stack system of claim 12, wherein:
the reactant feed channel comprises an internal fluid conduit extending between the reactant feed opening and an inlet riser opening extending through the reactant feed and return assembly and in fluid communication with the first inlet riser channel of the first fuel cell stack and the second inlet riser channel of the second fuel cell stack; and
the first nozzle structure and the second nozzle structure are located within the inlet riser opening of the reactant feed and return assembly.

14. The fuel cell stack system of claim 11, wherein the first nozzle structure is configured to accelerate a reactant flowing through the assembly prior to the reactant entering the first inlet riser channel of the first fuel cell stack.

15. The fuel cell stack system of claim 14, wherein the reactant comprises a fuel, and the first and the second fuel cell stacks comprise solid oxide fuel cell (SOFC) stacks.

16. A fuel cell stack system, comprising:
a column comprising at least a first fuel cell stack and a second fuel cell stack; and
a reactant feed and return assembly located between the first fuel cell stack and the second fuel cell stack in the column,
wherein the reactant feed and return assembly is in fluid communication with the first fuel cell stack and the second fuel cell stack and is configured to provide a reactant feed to, and receive a reactant exhaust from, each of the first fuel cell stack and the second fuel cell stack, and wherein the reactant feed and return assembly comprises a nozzle structure along a flow path of the reactant feed, the nozzle structure having a width dimension that decreases along a direction of the flow path of the reactant feed through the nozzle structure to an entrance of the first fuel cell stack of the column, wherein the nozzle structure is located external to the first fuel cell stack and to the second fuel cell stack and a central axis of the nozzle structure is vertically coincident to the entrance to the first fuel cell stack of the column, and the width dimension of the nozzle structure at an exit from the nozzle structure is less than a width dimension of the entrance of the first fuel cell stack of the column.

17. The fuel cell stack system of claim 16, wherein the nozzle structure comprises a first nozzle structure along a flow path of the reactant feed to the first fuel cell stack of the column and the reactant feed and return assembly further comprises a second nozzle structure along a flow path of the reactant feed to the second fuel cell stack of the column.

18. The fuel cell stack system of claim 17, wherein the reactant feed and return assembly comprises an anode splitter plate (ASP) and the first and second fuel cell stacks comprise solid oxide fuel cell (SOFC) stacks.

19. The fuel cell stack system of claim 17, wherein the reactant feed and return assembly further comprises a reactant feed channel located between a first interior wall and a second interior wall of the assembly, and wherein an opening in the first interior wall defines an entrance to the first nozzle structure and an opening in the second interior wall defines an entrance to the second nozzle structure.

* * * * *